United States Patent [19]
Copple et al.

[11] Patent Number: 5,380,136
[45] Date of Patent: Jan. 10, 1995

[54] ANCHOR NUT MOUNT

[75] Inventors: Charles M. Copple, Kent; Leonard F. Reid, Bellevue, both of Wash.

[73] Assignee: Fatigue Technology, Inc., Seattle, Wash.

[21] Appl. No.: 121,077

[22] Filed: Sep. 14, 1993

[51] Int. Cl.6 .................. F16B 37/00; F16B 37/04; F16B 39/28

[52] U.S. Cl. .................... 411/183; 411/104; 411/113; 411/432

[58] Field of Search ........... 411/84, 85, 111-113, 411/104, 177, 180, 183, 432

[56] References Cited

U.S. PATENT DOCUMENTS

| | | |
|---|---|---|
| 2,249,923 | 7/1941 | Whitcombe . |
| 2,304,107 | 12/1942 | Leisure ............................. 411/111 |
| 2,413,669 | 12/1946 | Whitcombe . |
| 2,438,044 | 3/1948 | Freesz .............................. 24/221 |
| 2,477,429 | 7/1949 | Swanstrom et al. ........... 411/104 X |
| 2,825,380 | 3/1958 | Reiner . |
| 3,180,387 | 4/1965 | Dzus et al. ....................... 411/111 |
| 3,537,499 | 11/1970 | Dey ................................. 411/111 |
| 3,566,662 | 3/1971 | Champoux ........................ 72/370 |
| 4,187,708 | 2/1980 | Champoux ........................ 72/30 |
| 4,295,766 | 10/1981 | Shaw ................................ 411/113 |
| 4,425,780 | 1/1984 | Champoux ........................ 72/370 |
| 4,695,212 | 9/1987 | Berecz ............................. 411/85 |
| 4,768,907 | 9/1988 | Gauron ............................ 411/85 |
| 4,790,701 | 12/1988 | Baubles ........................... 411/85 |
| 4,830,557 | 5/1989 | Harris et al. .................... 411/113 |
| 4,863,327 | 9/1989 | Pouplier . |
| 4,875,816 | 10/1989 | Peterson .......................... 411/104 |
| 4,895,484 | 1/1990 | Wilcox ............................ 411/85 |
| 5,096,349 | 3/1992 | Landy et al. .................... 411/108 |
| 5,096,350 | 3/1992 | Peterson .......................... 411/112 |
| 5,146,668 | 9/1992 | Gulistan .......................... 29/525 |
| 5,193,643 | 3/1993 | McIntyre ....................... 411/104 X |

OTHER PUBLICATIONS

Technical Manual: "Waldes Truarc Retaining Ring", Waldes Kohinoor, Inc., 47-16 Austel Place, Long Island City, N.Y. 11101; p. 5; 20th Printing, 1981.

Technical Manual: "ESNA Aerospace Fastener Catalog 687", Harvard Industries, 1987, by Harvard Industries, Inc., 2330 Vauxhall Road, Union, N.J. 07083; pp. 80 and 119.

*Primary Examiner*—Neill R. Wilson
*Attorney, Agent, or Firm*—Delbert J. Barnard; David P. Campbell

[57] ABSTRACT

An anchor nut mount (10) including a mount base (13) and a snap ring (14), the mount base (13) including a base plate (15) having base sidewall portions (16) and radial slots (18) defined in the outer side regions (20) of the base sidewall portions (16). The snap ring (14) includes a loop portion (32) and enlarged end knobs (34). The snap ring (14) mounts onto the mount base (13) with the loop portions (32) of the ring carried by the radial slots (18). The snap ring (14) and base sidewall portions (16) removably secure an anchor nut (12) to the nut mount (10) for positioning about a fastener hole.

21 Claims, 12 Drawing Sheets

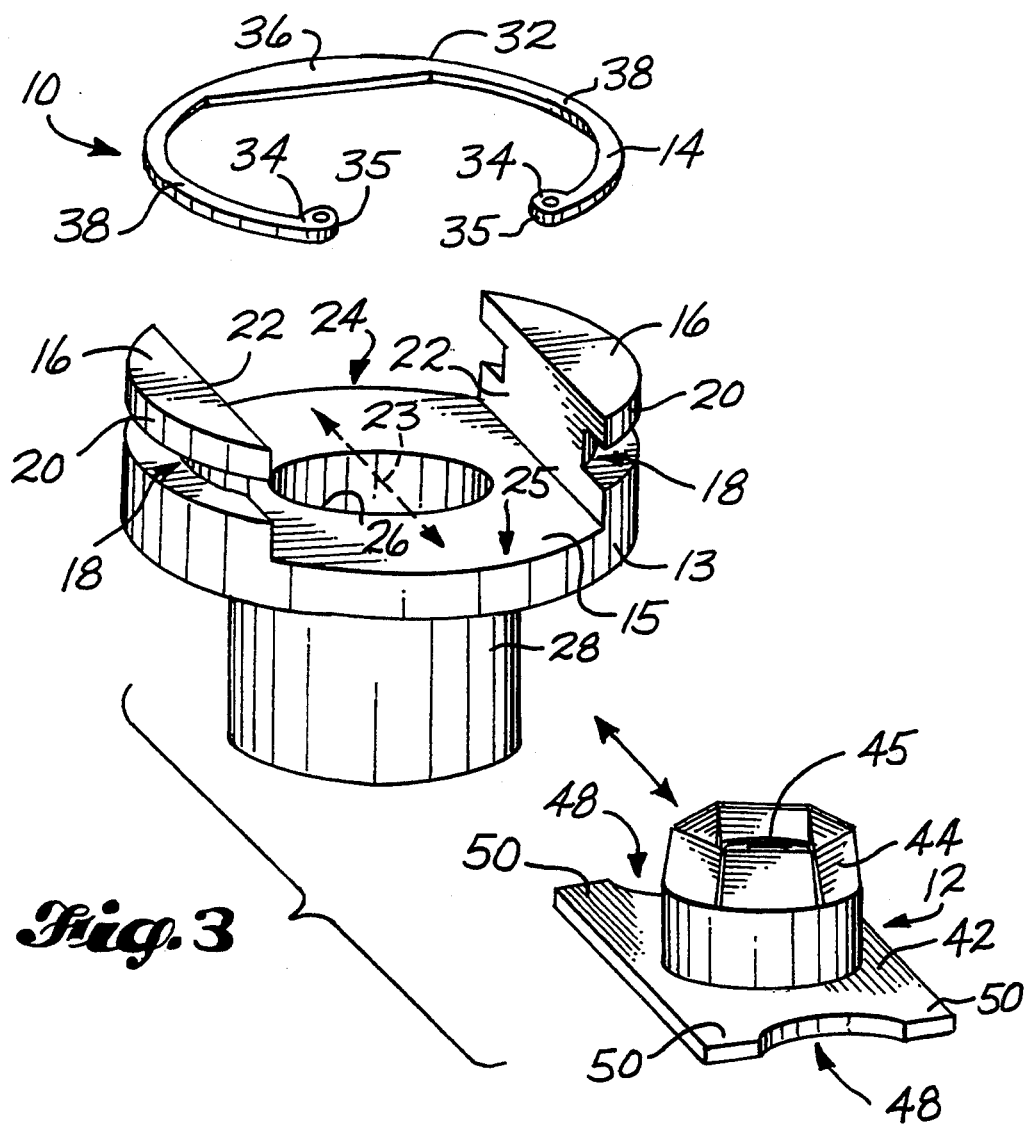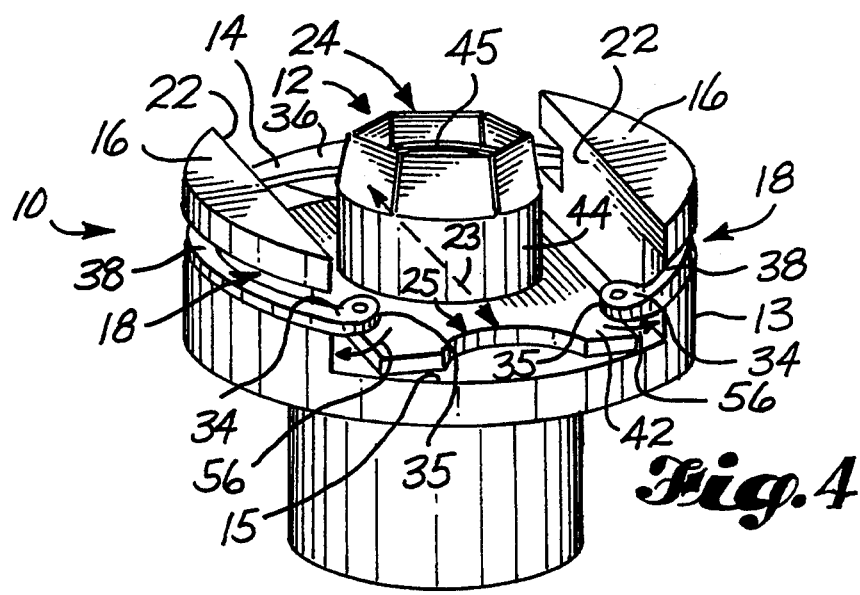

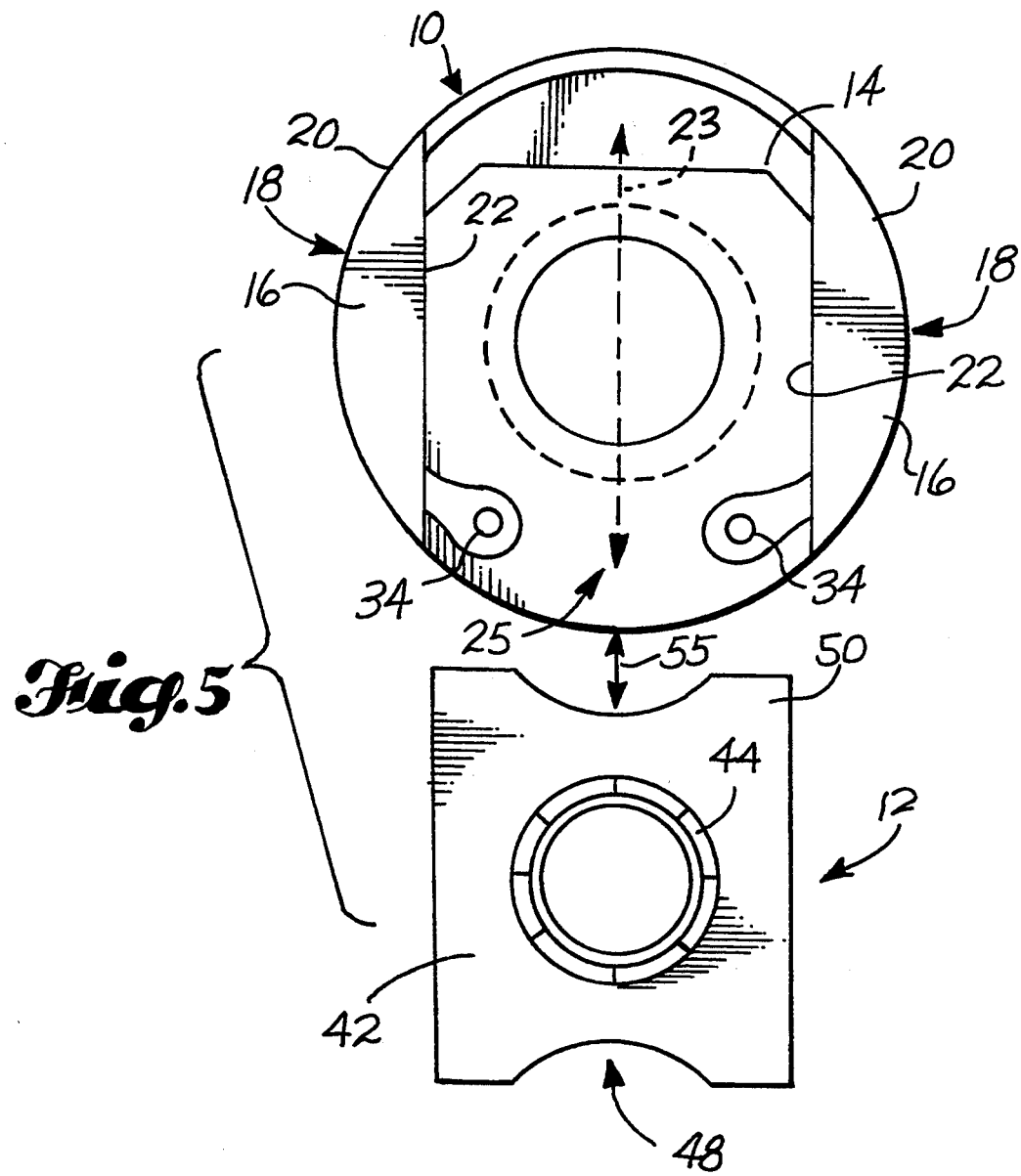

ANCHOR NUT MOUNT

TECHNICAL FIELD

The present invention relates to fasteners for aircraft parts or the like. More particularly, the present invention relates to the provision of an anchor nut mount that positions an anchor nut for connection to a threaded bolt for fastening or attaching two aircraft structures together.

BACKGROUND INFORMATION

An anchor nut mount is a tool for securing a fastener nut or anchor nut in place. It is used in combination with a threaded bolt to secure a first structure, such as an aircraft wall or cover panel, to a second structure, such as an aircraft frame. While the present invention can be utilized to fasten many types of structures together in a variety of applications, for purposes of illustration, the present invention shall be discussed with reference to aircraft/aerospace applications.

The nut mount is secured about a fastener hole in the first aircraft structure, and the anchor nut is secured to the nut mount. A typical device used for securing the anchor nut to the nut mount is a spring clip. The spring clip is mounted to the nut mount at the same time the anchor nut is mounted to the nut mount. A threaded bolt is inserted through the second aircraft structure, through the fastener hole in the first aircraft structure, and through a bolt-receiving hole in the nut mount. The threaded bolt is screwed into the anchor nut and tightened to secure the two aircraft members together.

U.S. Pat. No. 5,096,349 of Landy et al., issued Mar. 17, 1992, and entitled, "Nut Mounting Grommet," discloses an anchor nut mounting device that is mounted to a wall, for securing an anchor nut. The device is a grommet and includes a tubular shank retainer that closely fits into a circular opening in the wall of a structure. A nut mount is formed integral with the tubular shank retainer and is adapted to receive the anchor nut following securement of the grommet to the wall. The nut mount includes a base plate having a circular opening that is aligned with the tubular passageway of the tubular shank retainer. The nut mount is in the form of a tubular cup having a sidewall that is longer than the anchor nut. The end portion of the tubular cup is deformed inwardly to block removal of the anchor nut from the cup.

Another known construction for an anchor nut assembly includes a base plate having a hole therein for receiving the threaded end of a bolt. The base plate includes an additional rivet hole on each side of the bolt hole for riveting the base plate to the wall. The base plate includes a pair of upright sidewalls facing the bolt hole. The sidewalls each include a slot extending therethrough aligned longitudinally of the base plate. A pair of stops project upwardly from the base plate along the longitudinal centerline of the base plate, with the stops positioned on opposite sides of the bolt hole. The anchor nut is positioned between the stops and the sidewalls of the base plate and is held therein by a retainer ring that includes a pair of elbows extending through the slots of the sidewalls. The pair of upwardly projecting stops limit the longitudinal movement of the anchor nut on the base plate. Once installed, the sidewalls prevent the flat sides of the anchor nut from rotating during connection of the threaded bolt. A similar type arrangement for an anchor nut assembly is utilized in a gang channel.

The above-discussed anchor nuts have a disadvantage in that they are time consuming and labor intensive to install. Several steps are involved in the attachment of the base plate to the wall and of the anchor nut and spring clip to the anchor base. Having to secure the spring clip manually to the base plate adds a step in the mounting process. In the aircraft industry, as in many other labor-intensive industries, every manufacturing step that is performed manually increases the time required as well as the expense involved in assembling an aircraft, and it also introduces the potential for worker error.

In addition, the foregoing discussed anchor nut assemblies either do not permit removal of the anchor nut once installed or require separate removal of the retainer ring. For example, for an access panel in an aircraft, the anchor nut is replaced from time to time. In those prior art anchor nut assemblies that do permit anchor nut removal, the retainer ring has to be removed, the anchor nut replaced, and the retainer ring refastened to the nut mount.

The present invention is an improved anchor nut mount and has as an object simplifying the anchor nut mounting and removal process, thereby reducing the time, effort, and expense required for securing structural members together.

SUMMARY OF THE INVENTION

Briefly described, the present invention comprises an anchor nut mount and a snap ring or retainer ring held thereon for securing an anchor nut to a wall or other structural member, such as an access panel that may be found in an aircraft. The purpose of the anchor nut mount is to position the anchor nut about a fastener hole so that the anchor nut can receive a threaded bolt inserted through an adjacent wall or structural member for securing the two structural members together.

The anchor nut mount includes a mount base having a base plate and a pair of laterally-spaced base sidewall portions projecting from the base plate. The base plate and sidewall portions together define a nut channel along the base plate having a first and second end. The base sidewall portions comprise a snap ring or retainer ring support structure for supporting a snap ring or retainer ring above the base plate. In a first embodiment, the base sidewall portions include outer side regions that each have a snap ring-receiving radial slot that is spaced above the base plate of the mount base. In a second embodiment, the inner side regions of the base sidewall portions include the snap-receiving slots. In another embodiment, the end portions of the base sidewall portions include the snap ring-receiving slots.

The snap ring or retainer ring has a closed end and a pair of end parts or knobs spaced from each other. The closed end extends around the first end of the nut channel, and the end knobs are positioned at the second end of the nut channel. The side portions of the snap ring are held in the snap ring-receiving radial slots of the base sidewall portions. The ring end knobs project from the base sidewall portions laterally into the second end of the nut channel and define between them a nut avenue. The ring end knobs ]lave cam surfaces facing each other for guiding the anchor nut through the nut avenue into and out of the nut channel.

The snap ring is openable by contact of the tubular neck of the anchor nut with the cam surfaces of the ring end knobs as the nut is snap moved into or snap moved out from the nut channel through the nut avenue. As the anchor nut is snap moved into or out of the nut channel, the base of the nut slides between the base plate and snap ring of the nut mount.

The base plate includes a circular bolt hole. In one embodiment, an integral tubular shank retainer portion extends from the base plate on the opposite side from the base sidewall portions. The tubular shank retainer aligns with the circular bolt hole of the base plate. The integral tubular shank retainer and base plate form a shoulder for seating the nut mount in a fastener hole of a structural member. The integral tubular shank retainer allows the material around the fastener hole in the structural member to be coldworked by a mandrel and split sleeve, in a process similar to the coldworking process described in U.S. Pat. No. 3,566,662 of Louis A. Champoux, granted Mar. 2, 1971, and entitled, "Coldworking Method and Apparatus." Also, the tubular shank retainer can be coldworked by a mandrel only process or by a split mandrel process.

The anchor nut includes a base portion and a threaded neck upstanding from the base portion. The base portion is held between the base sidewall portions of the nut mount, and the threaded neck is held between the closed end and ring end knobs of the snap ring. The dimensions of the spacing between the base sidewall portions and the snap ring allow the anchor nut base portion some float both in a lateral and longitudinal direction about the circular bolt hole in the base plate. This allows the threaded passageway of the anchor nut to be manually aligned with the threaded bolt inserted through the nut mount. The exact design of the snap ring will control the amount of float of the nut within the channel.

The nut mount is manufactured with the snap ring mounted onto the base sidewall portions of the mount base and remains mounted thereto. It is not necessary for a worker to remove the snap ring to mount the anchor nut to the nut mount. It is also not necessary to remove the snap ring to remove or to replace the anchor nut. To install the improved anchor nut mount, the mount base is inserted into the hole of a structural member and coldworked therein, or the mount base otherwise is secured for mounting about the fastener hole. The threaded bolt is then inserted through the second structural member and through the circular bolt hole of the mount base. The anchor nut is aligned with the threaded bolt and the two pieces are fastened together to secure the two structural members.

This method of fastening two structural members together eliminates the step of manually having to position a spring clip onto a base plate to secure the anchor nut to the base plate. With the present invention, a worker simply snap moves or snap fits the anchor nut onto the mount base after the mount base is positioned in place about the fastener hole. Where the previously-discussed prior art anchor nuts generally require an additional step of mounting the spring clip to secure an anchor nut about a fastener hole, the present invention eliminates this step, thereby simplifying the anchor nut mounting process. Thus, the design of the present invention requires less time and effort for installation than prior art fastener devices, and also, in one embodiment, allows for the coldworking of the area around the hole in the structural member, which significantly improves the fatigue life of the aircraft component.

In addition, the design for the snap ring support structure allows the anchor nut to be easily removed or replaced without having to remove and replace the snap ring.

Other objects, features and advantages of the present invention will become apparent from the following description of the best mode and the accompanying drawings and the claims, which are all incorporated herein as part of the disclosure of the invention.

BRIEF DESCRIPTION OF THE DRAWINGS

FIG. 3 is an exploded view of the mount base and snap ring of a first embodiment of the anchor nut mount of the present invention for use in mounting an anchor nut;

FIG. 4 is an assembled view of the nut mount and anchor nut of FIG. 1;

FIG. 5 is a plan view of the mount base and snap ring and the anchor nut illustrating the step of inserting the anchor nut onto the mount base;

BEST MODE FOR CARRYING OUT THE INVENTION

Figure 1:
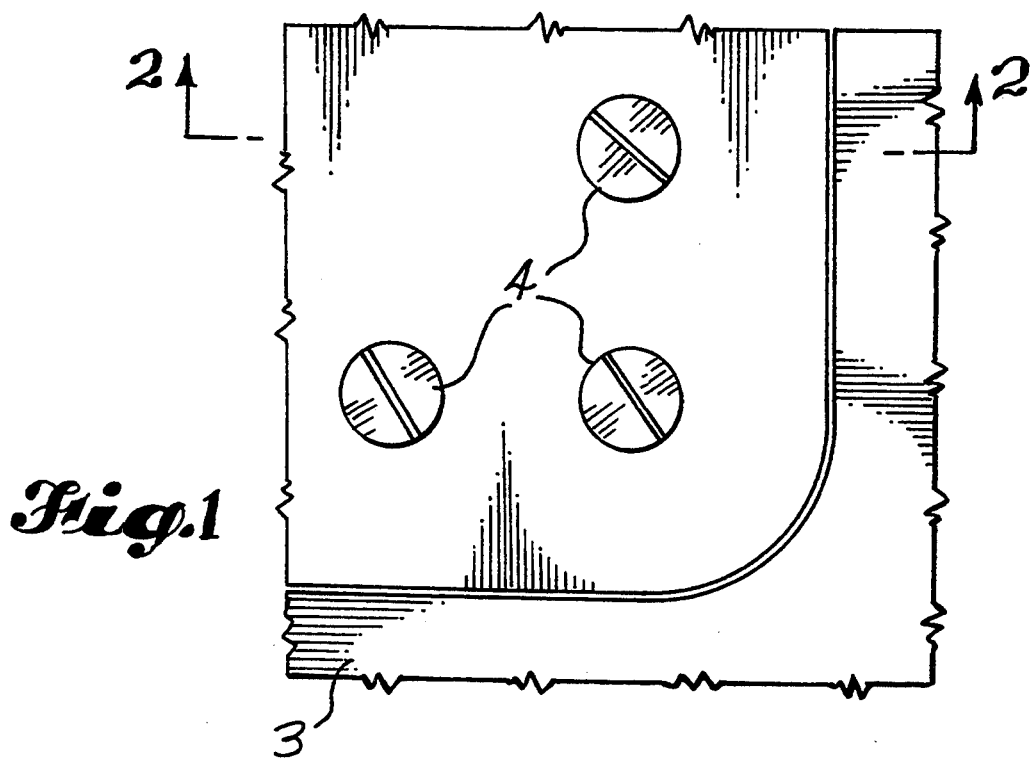
FIG. 1 is a fragmentary plan view of a corner portion of an inspection plate or access panel, which is secured in place by use of a plurality of fastener bolts.
Figure 2:
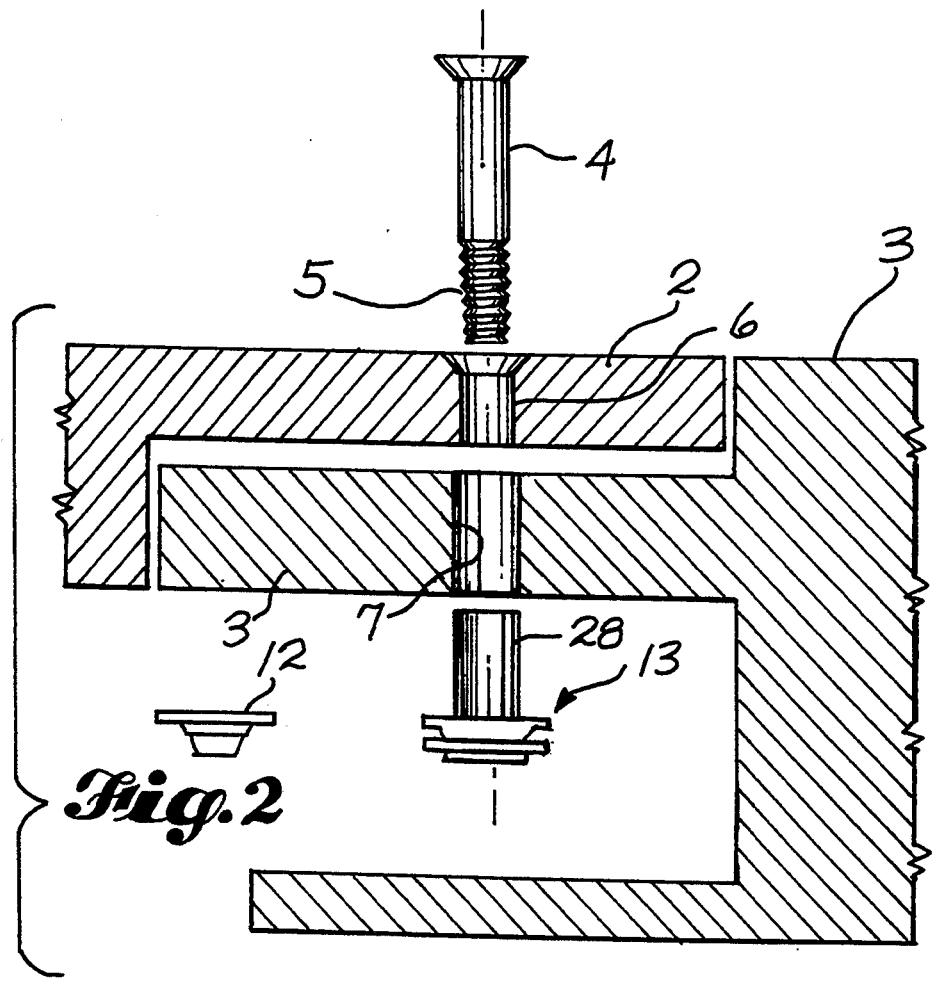
FIG. 2 is a fragmentary sectional view taken substantially along the line 2—2 of FIG. 1, with the several parts shown exploded.

Referring now to the drawings, in which like numerals reference like parts throughout the several views, in FIGS. 1 and 2, member 2 is an example first member that needs to be removably secured to an example second member 3. By way of typical and therefore nonlimitive example, member 2 may be an inspection plate and member 3 may be a flange that borders an opening normally covered by the inspection plate 2. The inspection plate 2 is secured to the flange 3 by means of a plurality of bolts 4 that include threaded end portions 5. The threaded portion 5 of each bolt 4 screws into a threaded opening in an anchor nut 12. The nut 12 that is illustrated is a conventional aircraft nut. The nut 12 is held in place by a nut mount 13 having an integral tubular shank retainer 28. The inspection plate 2 includes a fastener hole 6, and the flange 3 includes a fastener hole 7. The threaded bolt 4 inserts through the fastener holes 6, 7 and through a bolt hole in the mount base 13 to secure to the anchor nut 12.

FIG. 3 is an exploded view of the anchor nut mount 10 of the present invention for use in conjunction with an anchor nut 12. U.S. Pat. No. 5,096,349 of Landy et al. discloses an anchor nut and mount or grommet, as the term is used in the '349 patent, for use in fastening a first and second structural member together (see FIGS. 1-3). Likewise, my co-pending U.S. patent application, Ser. No. 07/755,167 discloses a similar anchor nut mount for use in securing two structural members together. The present invention is an improved anchor nut mount that can be utilized to fasten two similar structural members together.

Generally, the anchor nut mount 10 is secured in the fastener hole 6 in the first structural member 2, and the threaded bolt 4 is inserted through the matching fastener hole 7 in the second structural member 3. The anchor nut 12 is mounted on the nut mount 10 and is aligned with the threaded bolt. The threaded belt is inserted through the matching fastener holes and is threadably fastened to the anchor nut. The anchor nut 12 and nut mount 10, thereby, fixedly secure the two structural members together.

The anchor nut 12 is not initially fixedly mounted to the nut mount 10 for a couple of reasons. One, it is desirable, due to allowable manufacturing tolerances, for the anchor nut to have a degree of "float" about the nut mount. In other words, the anchor nut should have some lateral and longitudinal movement. This allows the threaded end of the bolt to easily aligned with the anchor nut when the threaded bolt is inserted through the fastener hole. Second, it is also desirable to coldwork the nut mount into position about the fastener hole prior to fastening the bolt. As will be discussed later, coldworking requires that the anchor nut be removed from the nut mount.

In a first embodiment, as shown in FIG. 3, the nut mount 10 includes a mount base 13 and a flexible snap ring or retainer ring 14. The mount base 13 includes a circular base plate 15 having a pair of base sidewall portions 16 extending upwardly from opposed outer edges of the circular base plate 15. Each base sidewall portion 16 includes a snap ring-receiving radial slot 18 extending around outer side regions 20 of the base sidewall portions 16. The radial slots 18 function as snap ring-receiving slots for holding the snap ring on the mount base.

The outer side regions 20 of the base sidewall portions 16 are circular and are machined integral with the base plate 15. The inner side regions 22 of the base sidewall portions 16 limit movement of the snap ring 14, as will be discussed later. The inner side regions 22 of the base sidewall portions 16 include a straight inner wall that forms a chord across the lateral side edges of the base plate 15. The inner side regions 22 of the base sidewall portions 16 define a nut channel as indicated by arrow 23 therebetween extending longitudinally along the base plate 15. The nut channel 23 has a first end 24 and a second end 25.

The base plate 15 includes a cylindrical bolt hole 26 positioned at the center of the base plate 15 and between the base sidewall portions 16. An integral tubular shank retainer 28 extends downwardly from the base plate 15. The interior tubular passageway of the tubular shank retainer 28 is aligned with the circular bolt hole 26 in the base plate 15, thereby defining a bolt-receiving passageway.

The flexible snap ring 14 includes a loop portion 32 and a pair of ring end knobs 34. The loop portion 32 includes a closed end 36 and two side portions 38. The closed end 36 includes a flat 37. The snap ring 14 generally is circular in shape and has a diameter approximately equal to or smaller than the diameter of the base plate 15. The ring end knobs 34 include cam surfaces 35 for guiding the anchor nut 12. The snap ring 14 may be like any of the numerous retainer rings disclosed in the "Waldes Truarc Retaining Rings" catalogue, 1981 edition, Waldes Kohinoor, Inc., Long Island City, N.Y., U.S.A.

The anchor nut 12 is a conventional aircraft nut and includes a base portion 42 and an internally threaded, tubular neck 44 upstanding from the base portion 42. The threaded neck 44 is internally threaded, indicated by reference 45, to receive a threaded end of a bolt (not shown) extending through the two structural members and through the nut mount 10. The ends of the base portion 42 include recesses 48 that create a tab 50 at each corner of the base.

FIG. 4 shows the anchor nut mount 10 and anchor nut 12 assembled. The snap ring 14 extends around the periphery of the base plate 15 with the ring side portions 38 held within the radial slots 18 of the base sidewall portions 16. The base sidewall portions 16 function as snap ring or retainer ring support structures, which support the snap ring 14 above the base plate 15. The base 42 of the anchor nut 12 is supported on the base plate 15 laterally between the inner side regions 22 of the base sidewall portions 16, and vertically between the base plate 15 and snap ring 14. The width of the base 42 of the anchor nut 12 is less than the spacing between the inner side regions 22 of the base sidewall portions 16. This creates a degree of lateral float in the anchor nut 12 so that the threaded bore 45 of the anchor nut can be laterally aligned with the threaded end of the bolt. Thus, it can be seen that the base sidewall portions 16, in addition to supporting the snap ring 14, function as lateral stops for containing the nut base laterally.

The closed end 36 of the snap ring 14 extends around the base sidewall portions ! 6 and closes off the nut channel 23 at the first end 24 thereof. The ring end knobs 34 project from the radial slots 18 in the base sidewall portions 16 toward the second end 25 of the nut channel 23. The cam surfaces 35 of the ring end knobs 34 are spaced from each other and define therebetween an anchor nut avenue, at the second end 25 of the nut channel 23. The ring end knobs 34 and the side portions 38 of the snap ring 14 can open, or move outwardly, as depicted by arrows 56, when the anchor nut 12 is snap moved into or out of the nut channel 23 along nut avenue 25. The threaded neck portion 44 of the anchor nut 12 engages the cam surfaces 35 of the ring end knobs 34 and forces the end knobs 34 laterally outwardly, allowing the anchor nut 12 to be slid onto and off of the anchor nut mount 10.

The flat 37 of the closed end 36 and the ring end knobs 34 of the snap ring 14 function as longitudinal stops that limit the longitudinal movement of the anchor nut 12 along the nut channel 23. The flat 37 limits longitudinal movement of the anchor nut 12 at the first end 24 of the nut channel 23, and the ring end knobs 34 do the same at the second end 25 of the nut channel 12. The end knobs 34 are enlarged inwardly toward the loop portion 32 to limit further the longitudinal movement of the anchor nut. The snap ring 14 is carried above the anchor nut base portion 42 so that the flat 37 and ring end knobs 34 engage the threaded neck 44, rather than the base portion 42, of the anchor nut 12. The flat 37 and ring end knobs 34 are spaced longitudinally from each other a distance greater than the diameter or width of the threaded neck 44. This provides the anchor nut 12 a degree of longitudinal float so that the anchor nut 12 can be easily aligned longitudinally with the threaded bolt. As should be apparent, the lateral float in the anchor nut 12, discussed previously, and the longitudinal float in the anchor nut 12 simultaneously allow the anchor nut 12 to be easily aligned with the bolt.

FIG. 5 is a plan view of the nut mount 10 and anchor nut 12 illustrating the method of inserting the anchor nut onto the nut mount. The anchor nut is inserted onto the nut mount in the direction of arrow 55. The base portion 42 of the nut slides beneath the ring end knobs 34 and between the inner side regions 22 of the base sidewall portions 16. The tubular neck 44 of the nut engages the ring cam surfaces 35, which expands the ring end knobs 34 outwardly of the second end 25 of the nut channel 23. When the tubular neck 44 has passed the ring end knobs 34, the ring end knobs 34 snap back into place and the anchor nut 12 is loosely held on the nut mount 10. The anchor nut 12 can be easily removed from the nut mount 10 by sliding the anchor nut out from the second end 25 of the nut channel 23, and expanding the ring end knobs 34 laterally outwardly. In this manner, the anchor nut 12 is easily removed from the nut mount 10 when, for example, it is necessary to remove an access panel. Also, the anchor nut 12 is easily replaced when necessary by simply sliding the anchor nut out from between the ring end knobs 34.

Figure 6:
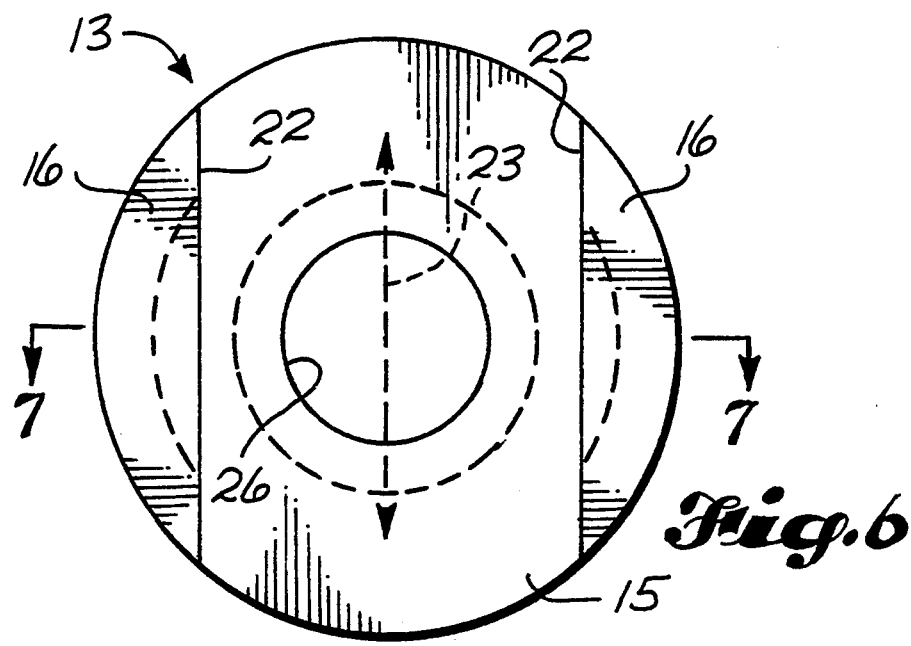
FIG. 6 is a plan view of the mount base of FIG. 3.

FIG. 6 is a top view of the mount base 13. The inner side regions 22 of the base sidewall portions 16 define the nut channel 23 extending between the base sidewall portions 16 longitudinally along the mount base 13. The circular bolt hole 26 in the base plate 15 is aligned at the center of the mount base 13. The circular bolt hole 26 is also aligned with the tubular passageway of the tubular shank retainer 28.

Figure 7:
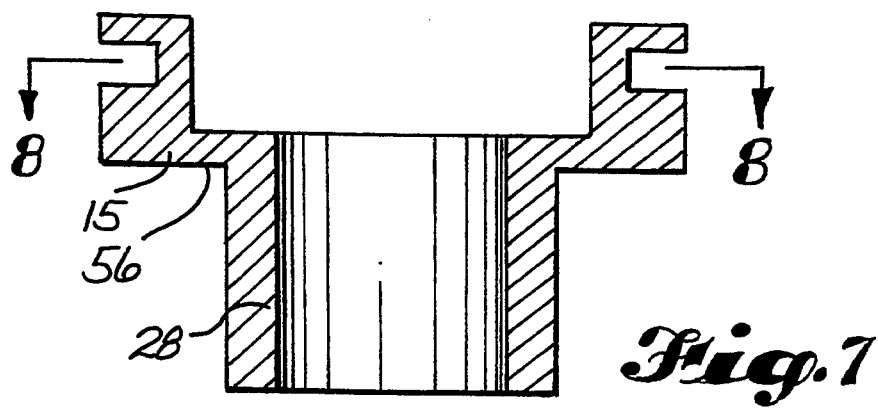
FIG. 7 is a cross-sectional view of the mount base taken along the line 7—7 of FIG. 6.
Figure 8:
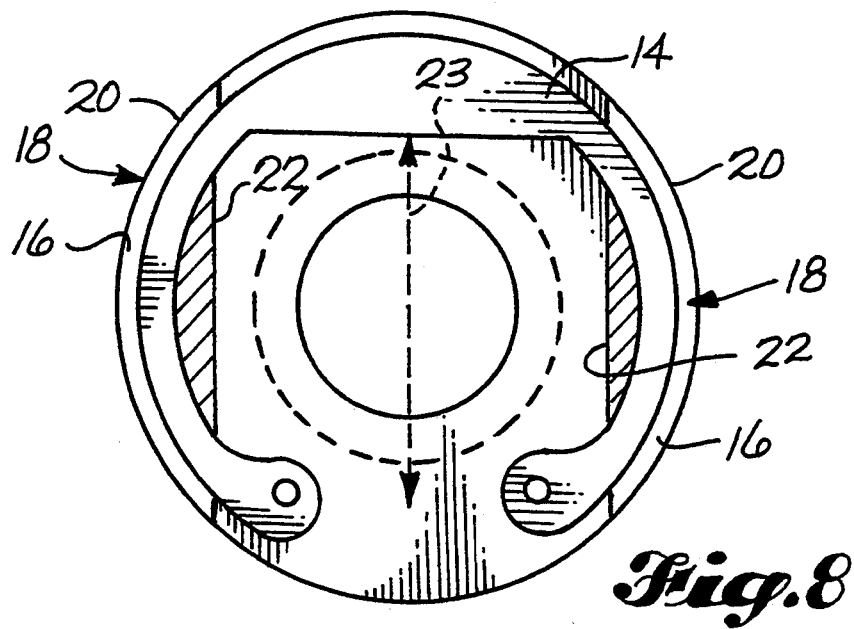
FIG. 8 is a top view taken along the line 8—8 of FIG. 7 showing the slots in the outer regions of the base sidewall portions of the mount base.

As shown in FIG. 7, the base plate 15 and the integral tubular shank retainer 28 of the mount base 13 form a shoulder 56. The shoulder 56 seats against the surface of the wall immediately surrounding the fastener hole upon insertion of the tubular shank retainer 28 into the fastener hole. As shown in FIG. 8, the radial slots 18 extend around the outer side regions 20 of the base sidewall portions 16. The inner side regions 22 of the base sidewall portions 16 limit movement of the spring clip 14 in the horizontal direction longitudinally and laterally about the nut channel 23.

The mount base 13 and its integral tubular shank retainer 28, preferably, are made of 17-4 PH stainless steel, per AMS 5643, condition H1025, subsequently passivated. The spring clip preferably is made of 302 CRES stainless steel or A286 stainless steel.

Figure 9:
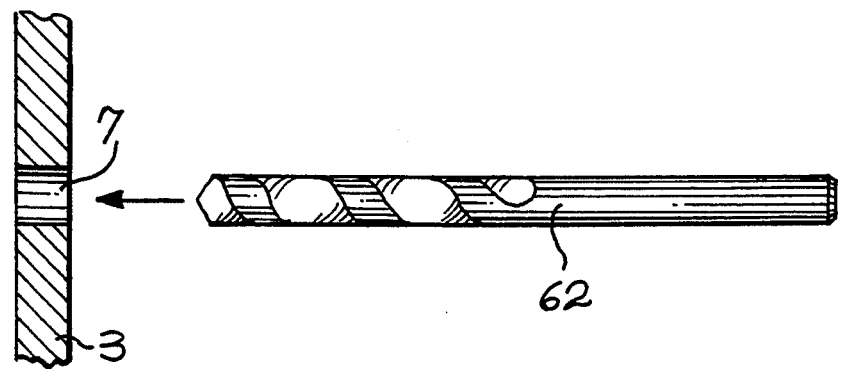
FIG. 9-15 are diagrammatic views of the major steps of the invention.
Figure 10:
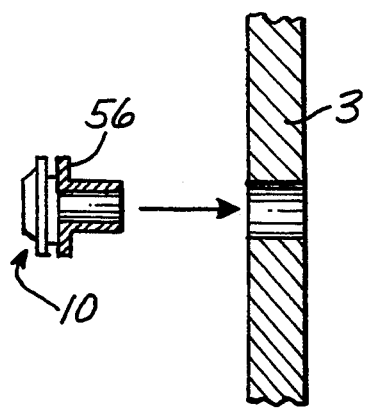
Figure 11:
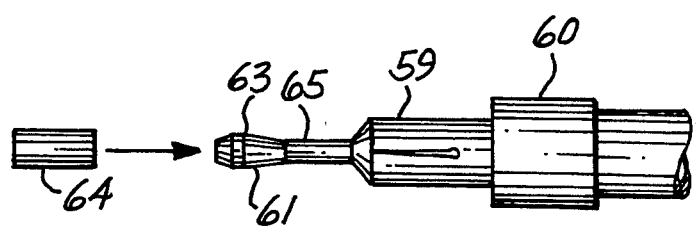

The installation of the anchor nut mount 10 is accomplished using tooling similar in application to cold expansion of a conventional fastener hole. As shown in FIG. 9, a fastener hole 7 is made in a workpiece by a drill bit 62. The nut mount 10 is inserted into the fastener hole 7 of the structural member 3 and is then coldworked into place. U.S. Pat. No. 5,096,349, with reference to FIGS. 10–25, describes a method for coldworking a nut mount. Generally, as shown in FIG. 10, the nut mount 10 is inserted into the fastener hole 7 in the structural member 3 and moved endwise until the shoulder 56 of the nut mount 10 is up against the wall of the first structural member 3. As shown in FIG. 11, a nosepiece 59 is then attached to a puller gun 60, in a manner described in U.S. Pat. No. 4,187,708 of Louis A. Champoux, granted Feb. 12, 1980, and entitled, "Pulling Apparatus and Method," and U.S. Pat. No. 4,425,780 of Louis A. Champoux, granted Jan. 17, 1984, and entitled, "Apparatus Having Extended Prestressing and Sleeve Retaining Devices for Prestressing Countersunk Fastener Holes and Method," which disclose a pullgun and a method and apparatus for coldworking a fastener hole, respectively.

Figure 12:
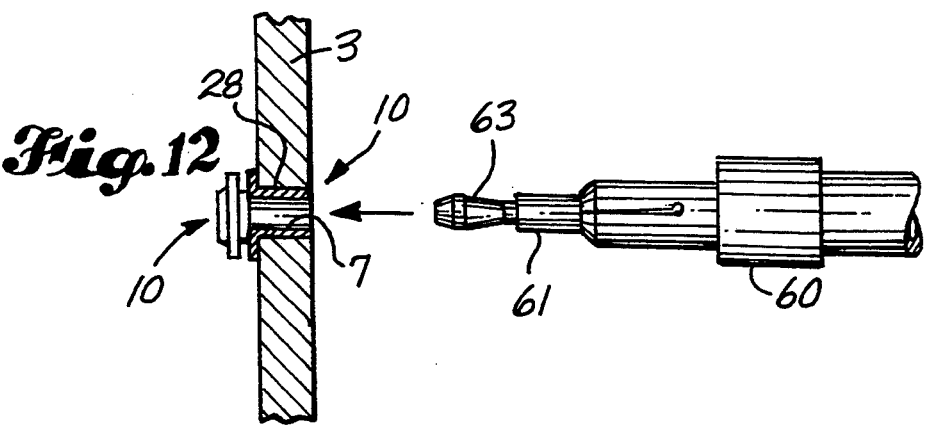
Figure 13:
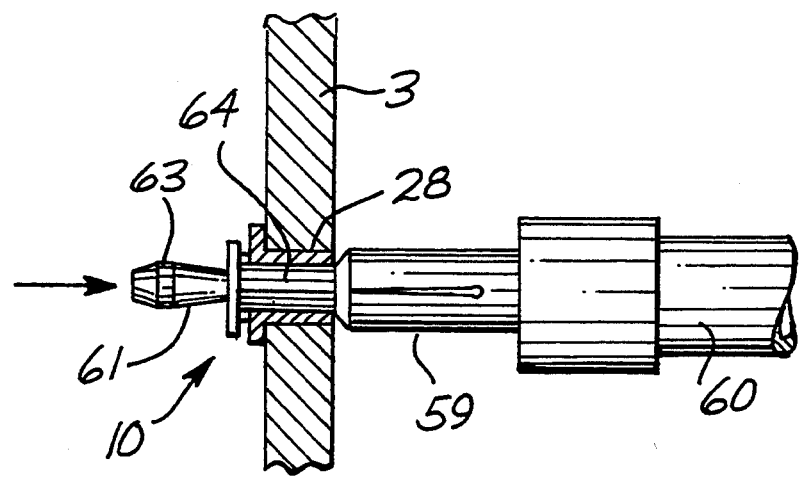

Generally, a mandrel 61 having an enlarged end 63 is utilized in conjunction with a pre-lubricated split sleeve 64 mounted onto a smaller diameter inner neck portion 65 of the mandrel 61. The mandrel 61 is attached to the hydraulically-operated puller gun 60. The mandrel 61 and split sleeve 64 are inserted through the fastener hole 7, as shown in FIG. 12, and through the tubular shank retainer 28 of the nut mount 10 until the split sleeve is seated within the fastener hole. The nosepiece holds the split sleeve 64 in place within the tubular shank retainer 28, while the puller gun 60 pulls the mandrel 61 through the hole 7, as shown in FIG. 13, so that the enlarged end 63 of the mandrel passes through the split sleeve 64 inside the nut mount 10, and, accordingly, the tubular shank retainer 28 of the nut mount.

The forceful movement of the enlarged end of the mandrel through the split sleeve causes a radial expansion of the split sleeve and the tubular shank retainer of the nut mount. The expansion that occurs is sufficient to cause a permanent increase in the outside and inside diameters of the tubular shank retainer. This radial expansion of the tubular shank retainer introduces fatigue life-enhancing compressive residual stresses in the wall immediately around the tubular shank, which stresses shield the fastener hole from the action of cyclic tensile stresses that propagate fatigue cracks.

The radial expansion also creates a tight interference fit between the tubular shank retainer 28 and the sidewall of the fastener hole in the first structural member. This tight interference fit secures the nut mount to the wall and provides resistance to torque and removal forces encountered during fastener installation and removal. The outer surface of the tubular shank retainer 28 may be machined or otherwise treated in order to give it an increased co-efficient of friction. For example, the nut mount may be turned on a lathe, and a series of small grooves may be machined in the outer surface of the tubular shank retainer. The outside surface of the tubular shank retainer 28 may also be roughened using a sand blasting technique. A more complete description of fatigue enhancement by cold expansion may be found in U.S. Pat. No. 3,566,662, granted Mar. 2, 1971, to Louis A. Champoux, and entitled, "Coldworking Method and Apparatus." It should be noted that a mandrel only or split mandrel coldworking process could be utilized, as well.

Figure 14:
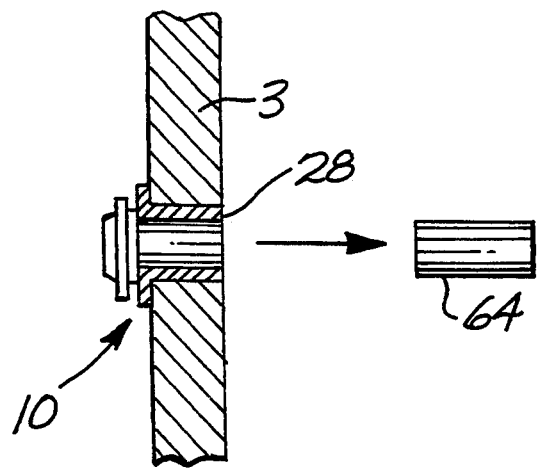
Figure 15:
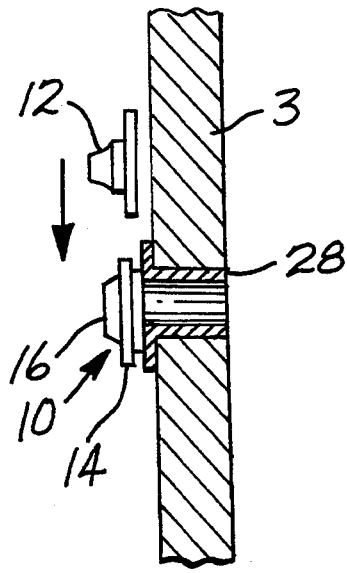

Following full retraction of the mandrel, the split sleeve 64 is removed and discarded, as shown in FIG. 14, and a worker snap moves the anchor nut 12 into the nut channel of the nut mount 10. The anchor nut 12 is snap fitted onto the nut mount until it is captured between the base sidewall portions 16 and the loop portion of the snap ring 14. Should the tubular shank be over-flush with the back side of the structural member 3 due to non-standard material thickness, the protruding shank may be spot faced or otherwise reproved.

A threaded bolt is then inserted through a fastener hole in a second structural member and the threaded bolt is aligned with the nut mount and inserted therethrough until captured by the anchor nut 12 (see FIG. 2). Tightening of the anchor nut rigidly secures the two structural members together. It has been found that the present apparatus and method for attaching an anchor nut is more efficient and less labor intensive than prior art methods. A worker has only to snap fit the anchor nut onto the nut mount. A separate step of fastening a spring clip to the nut mount using a special tool to secure the anchor nut thereon is not required. Thus, a worker can work more efficiently and secure a greater number of fasteners in less time as compared to previously-discussed prior art methods.

Figure 16:
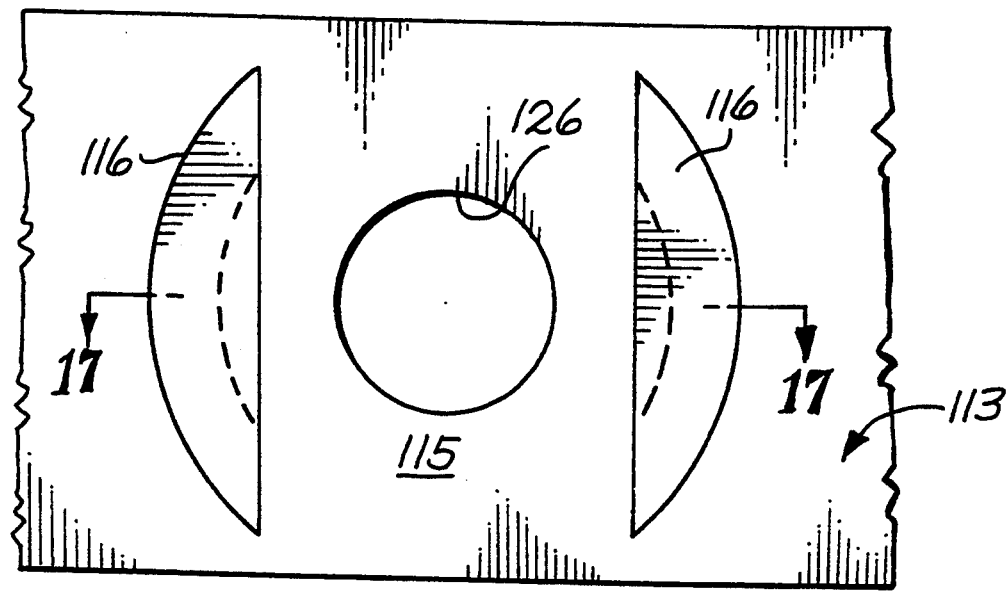
FIG. 16 is a top view of an alternative embodiment of the nut mount of the present invention.
Figure 17:
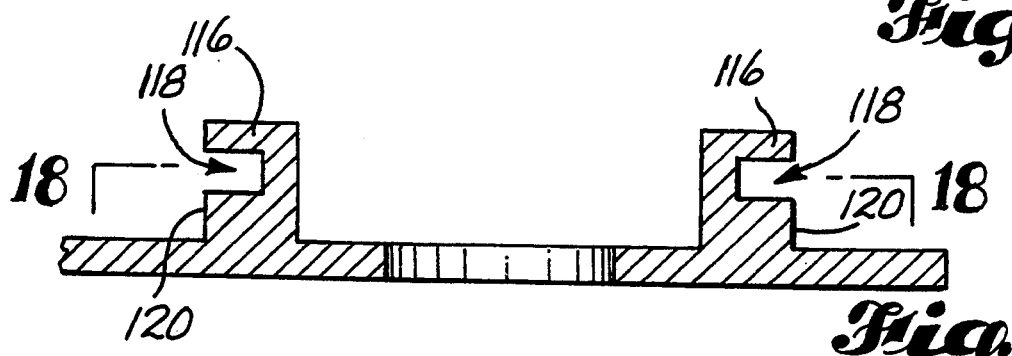
FIG. 17 is a cross-sectional view of the nut mount taken along the line 17—17 of FIG. 16.
Figure 18:
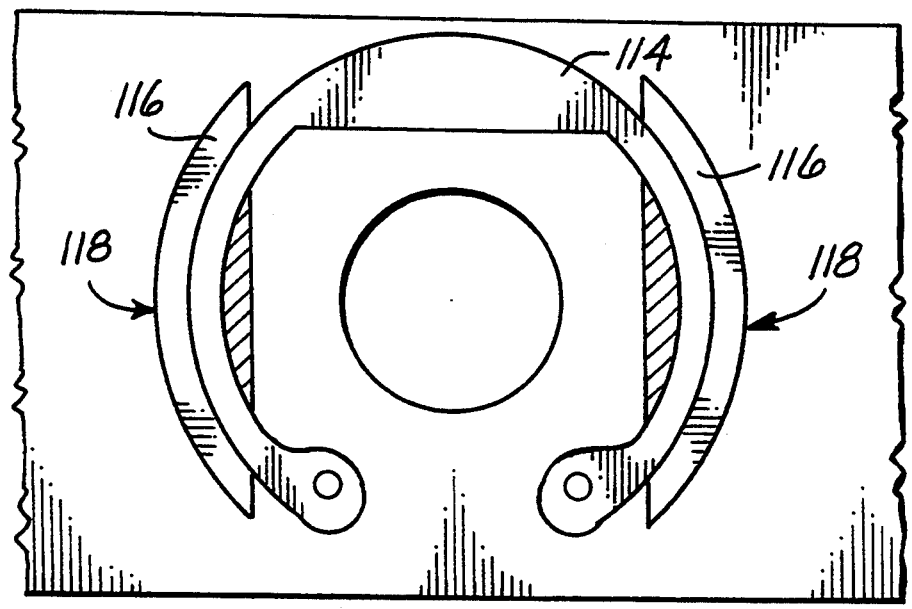
FIG. 18 is a top view of the mount base taken along the line 18—18 of FIG. 17, with the snap ring added in the slots of the outer regions of the base sidewall portions of the mount base.

FIGS. 16–18 illustrate an alternative embodiment for the base plate of the nut mount of the present invention. FIG. 16 is a top plan view of a mount base 113 having a base plate 115 and a pair of base sidewall portions 116 extending upwardly therefrom. A circular bolt hole 126 is formed in the base plate 115 at the center thereof between the base sidewall portions 116. The base plate 115 can be of any particular shape required for its attachment, for example, to a gang channel or other similar apparatus widely used in the aircraft/aerospace industry. Briefly, a gang channel is a steel or aluminum channel available in straight or radiused designs of varying lengths. The gang channels retain a plurality of floating, self-locking anchor nuts in a pre-established position. The anchor nut bases are fixed in the channel or formed integral therewith, while the anchor nuts themselves are individually removable.

In addition, the base plate 115 may include rivet holes (not shown) on each side of the base sidewall portions, for securing the base plate to a structural member in a conventional manner. While the provision of a tubular shank retainer for coldworking the nut mount is considered a preferred design for securing the nut mount to a structural member, the snap ring support structure and snap ring of the present invention can be utilized in combination with a rivet hole design to secure the nut mount.

As shown in FIG. 7, the base sidewall portions 116 each include a radial slot 118, which extend around the outer regions 120 of the base sidewall portions 116. The base sidewall portions 116 can be machined from the sides of the gang channel. As shown in FIG. 8, a snap ring 114 is carried by the base sidewall portions 116 within the radial slots 118 thereof, in a manner similar to that of the first embodiment shown in FIGS. 3–8. The inner side regions 122 limit movement of the snap ring 114.

With this embodiment, a plurality of mount bases 113 are secured to the gang channel or other structure in any well-known manner, with the snap rings 114 carried on the base sidewall portions 116 and the anchor nuts mounted to the nut mounts. The gang channel is secured to a first structural member about a series of fastener holes, and a set of threaded bolts are inserted through matching fastener holes on a second structural member and are threadably fastened to the anchor nuts to secure the two structural members together. It should be noted that the nut mount design of FIGS. 1–15 largely eliminates the need for a gang channel. The integral tubular shank retainer replaces the rivets of the nut mount as well as the rivets of the gang channel.

Figure 19:
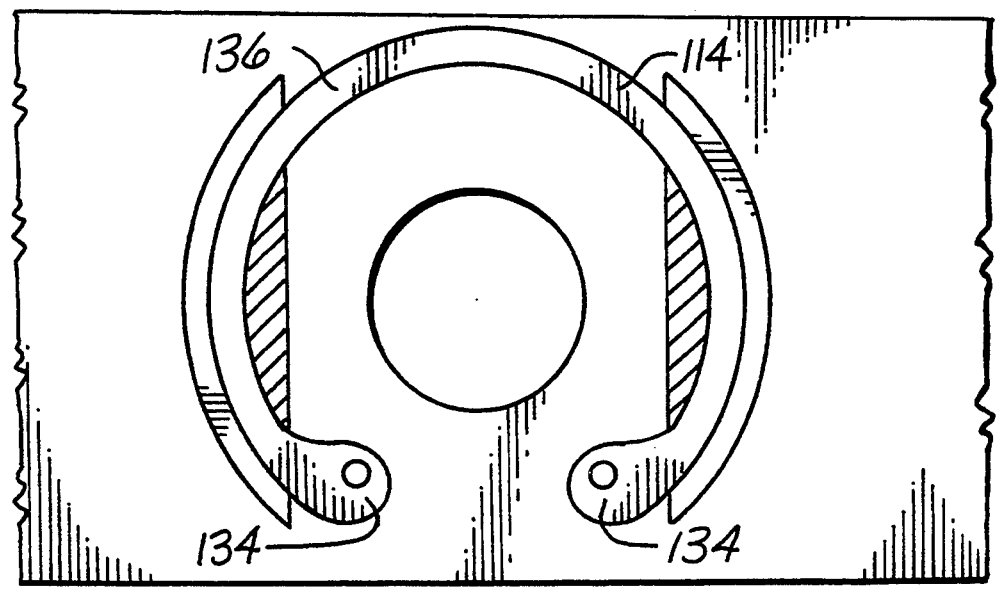
FIG. 19 is an alternative embodiment of the snap ring of FIG. 18.

As shown in FIG. 19, the snap ring 114 may be provided without a flat along its closed end 136. The purpose of the flat is to decrease the longitudinal spacing between the closed end 136 and ring end knobs 134, which decreases the longitudinal float in the anchor nut. In some applications, a conventional retainer ring without a flat may be desirable.

Figure 20:
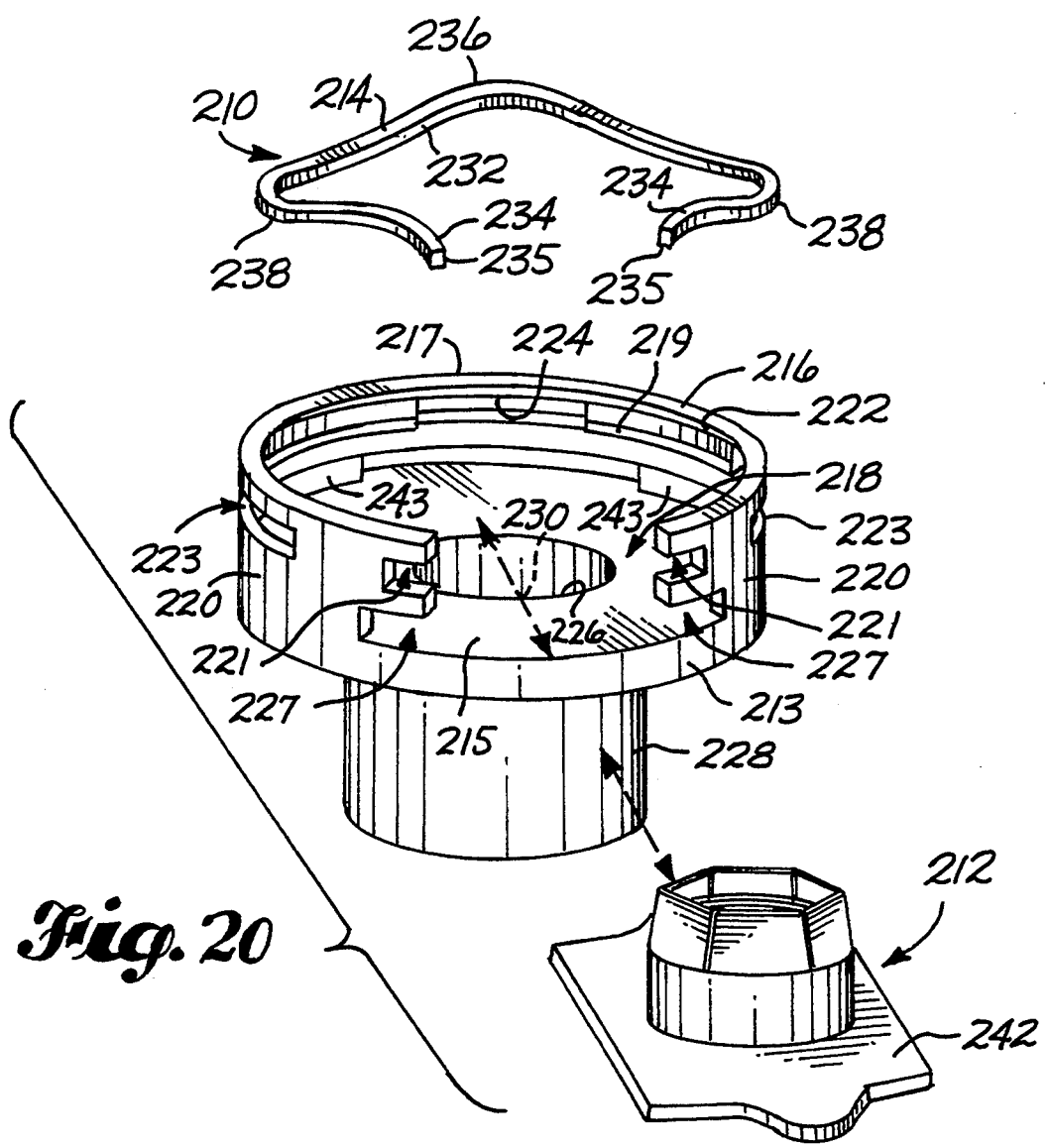
FIG. 20 is an exploded view of another alternative embodiment of the nut mount of the present invention.

FIGS. 20–26 illustrate alternative embodiments for the snap-ring or retainer ring support structures of the nut mounts of the present invention. FIG. 20 is an exploded isometric view of an alternative embodiment of a spring support structure 216 of a nut mount 210. The nut mount 210 includes a mount base 213 and a retainer ring 214. The mount base 213 includes a circular base plate 215 with a circular bolt hole 226 at the center thereof. A tubular shank retainer 228 extends below the base plate 215. The tubular shank retainer 228 is aligned with the circular bolt hole 226 to provide a passageway for a threaded bolt.

The spring support structure 216 includes a C-shaped wall 217 extending upright from the base plate 215. The C-shaped wall 217 defines an opening 218 for inserting and retracting the anchor nut 212 into and out from the base plate 215. The inner side regions 222 of the C-shaped wall 217 include an annular groove 219 for receiving the retainer ring 214. Groove 219 includes forward notches 221, elongated side slots 223, and rear slot 224, all extending through to the outer side regions 220 of the C-shaped wall 217.

Lower notches 227 are formed contiguous with the base plate 215 below the forward notches 221 of the annular groove 219. A rear notch 229 is provided, which extends through the lower rear portion of the C-shaped wall 217. Interior portions of the inner side regions 222 adjacent the base plate 215 may be machined out at 243 to provide clearance for the dimensions of the base portion 242 of the anchor nut 212.

The C-shaped walls 217 and opening 218 define a nut channel 230 for receiving an anchor nut.

The retainer ring 214 includes a loop portion 232 with side portions or elbows 238, a pair of end parts 234, and a closed end 236. The spring end parts 234 include cam surfaces 235 for guiding the anchor nut 212. The retainer ring 214 is generally rectangular in cross section throughout its entire length.

Figure 21:
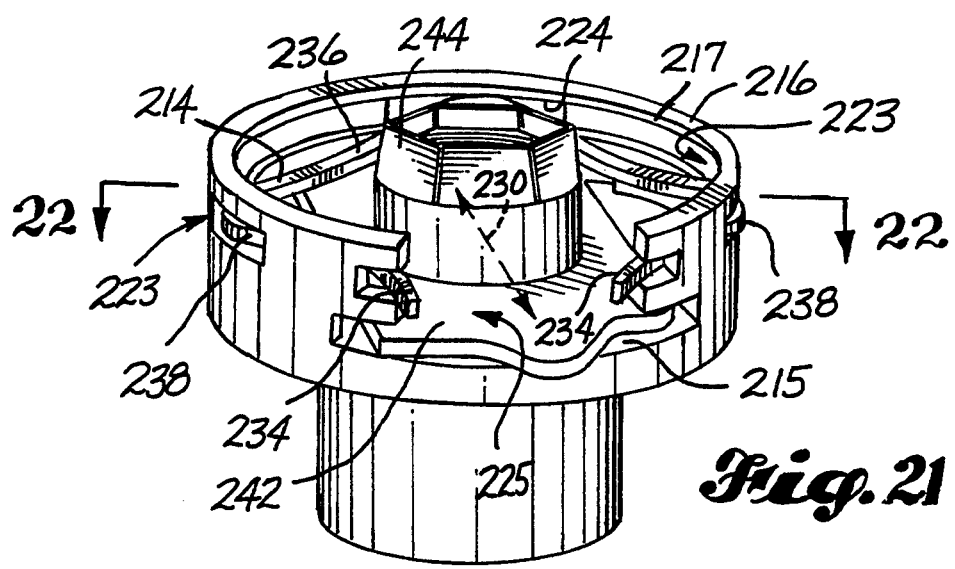
FIG. 21 is an assembled view of the nut mount of FIG. 20, shown with an anchor nut mounted to the nut mount.

As shown in FIG. 21, the elbow portions 238 of the retainer ring 214 are held within the elongated side slots 223 of the C-shaped wall 217. The closed end 236 of the retainer ring 214 is held within the rear slot 224. The length of the elbows 238 held within the slots 223 is less than the length of the slots 223 themselves. This provides the elbows sufficient clearance to expand upon snap fitting the anchor nut onto the nut mount. As with the nut mount of FIGS. 3–8, the anchor nut 212 is held on the nut mount 210 with the base 242 of the anchor nut positioned on the base plate surface 215 laterally between the spring support structure 216. The base 242 of the anchor nut is positioned vertically between the base plate 215 and the retainer ring 214. The tubular neck 244 of the anchor nut is positioned between the closed end 236 of the retainer ring 214 and the end portions 234. The spacing between the end portions 234 is less than the width of the tubular neck 244 of the anchor nut. This allows the end portions 234 to prevent the anchor nut from escaping out the second end 225 of the nut channel 230.

The mounting of the anchor nut 212 onto the nut mount 210 is similar to that of the embodiment shown in FIGS. 3–8. Briefly, the anchor nut 212 is snap moved or snap fitted through the end parts 234 of the retainer ring 214. The tubular neck 244 of the anchor nut 212 engages the cam surfaces 235 of the end parts 234 of the retainer ring 214, expanding the end parts 234 open as they guide the anchor nut into the nut channel 230. As the end parts 234 open, the elbows 238 expand within the elongated side slots 223 of the support structures 216. When the tubular neck 244 of the anchor nut 212 passes through the end parts 234, the anchor nut 212 is captured within the retainer ring 214 and is loosely mounted onto the nut mount. With this embodiment, the anchor nut 212 is easily removed from the nut mount 210 in one simple step and, likewise, easily replaced.

Figure 22:
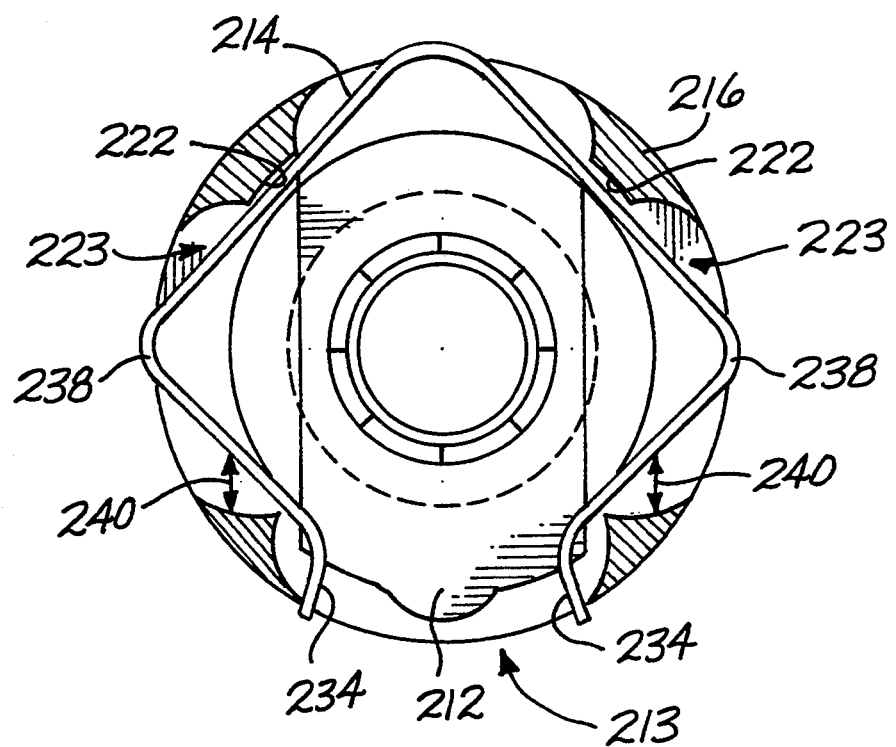
FIG. 22 is a top plan view of the nut mount and anchor nut of FIG. 21, taken along the line 22—22 thereof.

FIG. 22 is a top plan view of the nut mount 213 and anchor nut 212 of FIG. 21. As shown ion FIG. 22, the elbows 238 of the retainer ring 214 extend from the inner side regions 222 of the spring support structure 216 into the elongated side slots 223. The portion of the elbows 238 carried by the spring support structure 216 is narrower than the length of the slots 223. This provides a degree of clearance, as indicated by arrows 240. This clearance allows the elbows to project further into the elongated side slots 223 as the end parts 234 of the retainer ring 214 open to allow the anchor nut 212 to be snap fitted onto or off of the nut mount.

Figure 23:
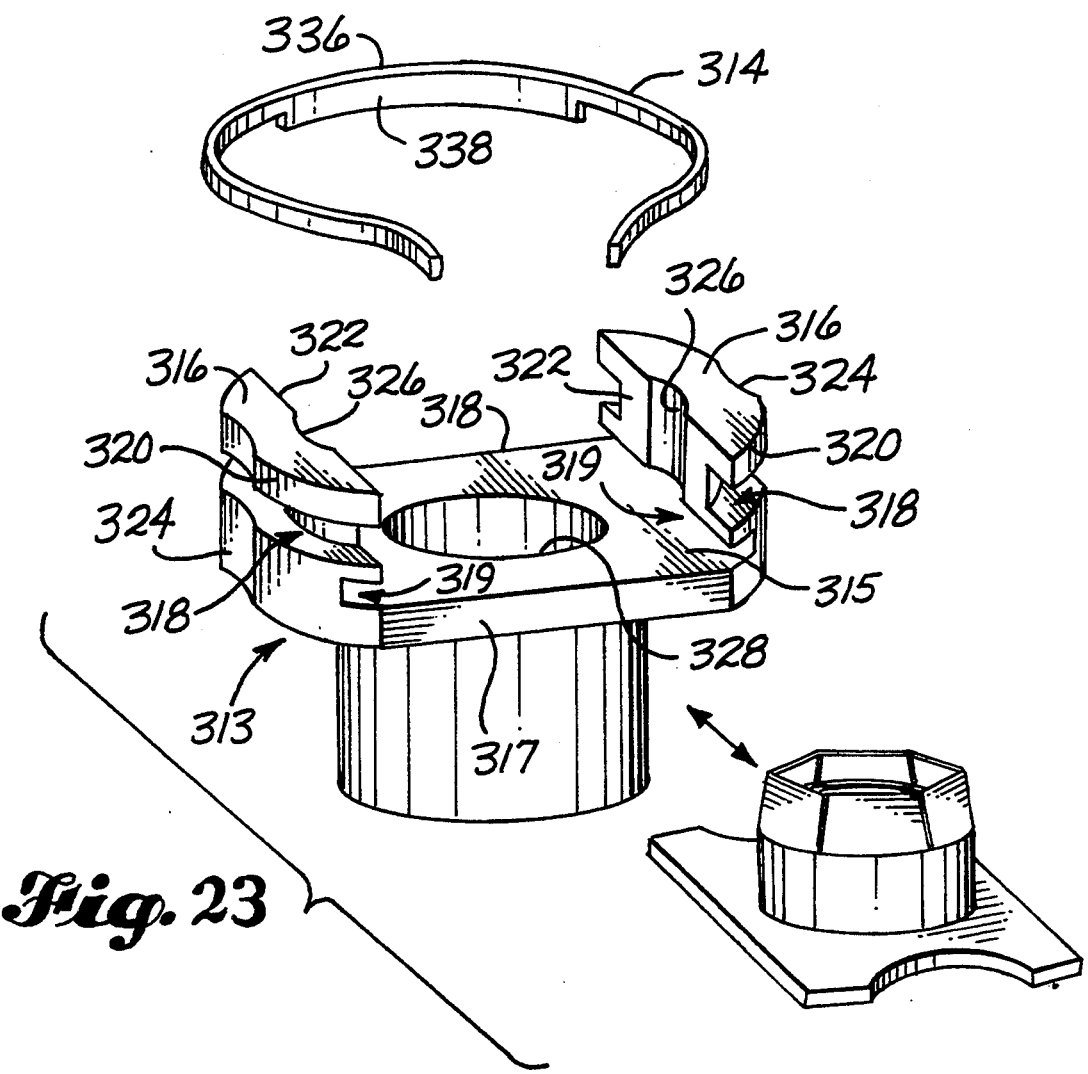
FIG. 23 is an exploded isometric view of another alternative embodiment of the nut mount of the present invention.

FIG. 23 is an isometric exploded view of an another alternative embodiment for the spring support structure 316. In this embodiment, the base plate 315 of the mount base 313 is squared at its front 317 and rear 318. The spring support structures 316 extend upwardly between the squared off ends 317, 318 of the base plate 315. The spring support structure 316 are formed in a similar manner to the snap ring support structures of FIGS. 3–8. However, the lower portions of the inner side regions 322 of the support structures 316 include a groove 319 extending longitudinally of the base plate 315. In addition, the outer side regions 320 include a recess 324, and the inner side regions 322 include recesses 326 aligned with the circular bolt hole 328 of the base plate 315. Recesses 326 provide the tubular neck of the anchor nut a degree of lateral float.

The retainer ring 314 is similar to the retainer ring of FIGS. 21 and 22. However, the closed end 336 of the retainer ring is more rounded than the closed end of the retainer ring of FIGS. 21 and 22. In addition, the closed end 336 includes a collar 338 extending downwardly therefrom. Collar 338 prevents the retainer ring from twisting.

Figure 24:
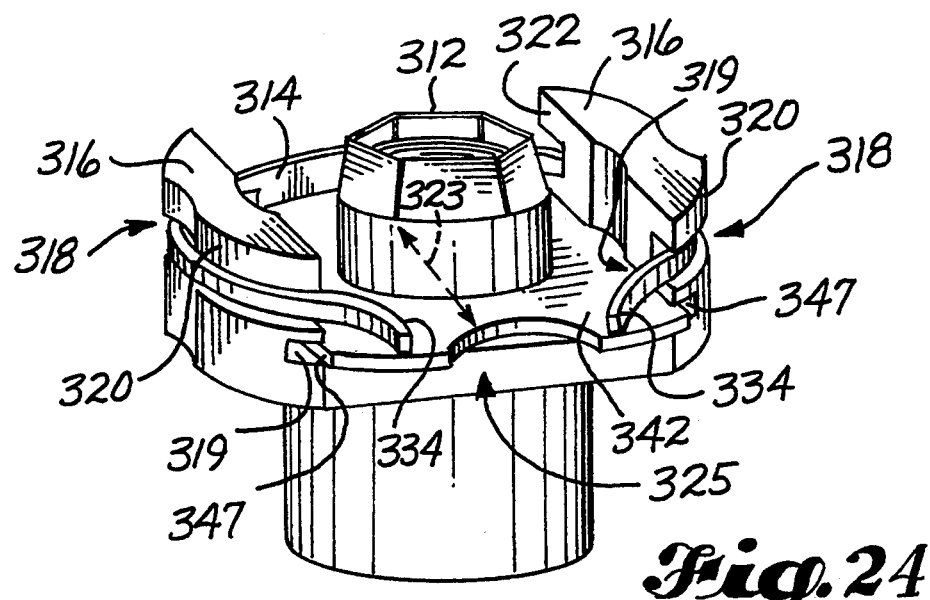
FIG. 24 is an assembled view of the nut mount of FIG. 23, shown with an anchor nut mounted to the nut mount.

As shown in FIG. 24, the retainer ring 314 is carried by the radial slots 318 in the outer side regions 320 of the spring support structures 316. The end portions 334 of the retainer ring 314 restrict the second end 325 of the nut channel 323 defined by the support structures 316. The outer lateral edges 347 of the base portion 342 of the anchor nut 312 are captured within the grooves 319 in the lower portions of the inner side regions 322 of the support structure 316. Grooves 319 prevent the anchor nut 312 from pushing out upon insertion of the bolt.

Figure 25:
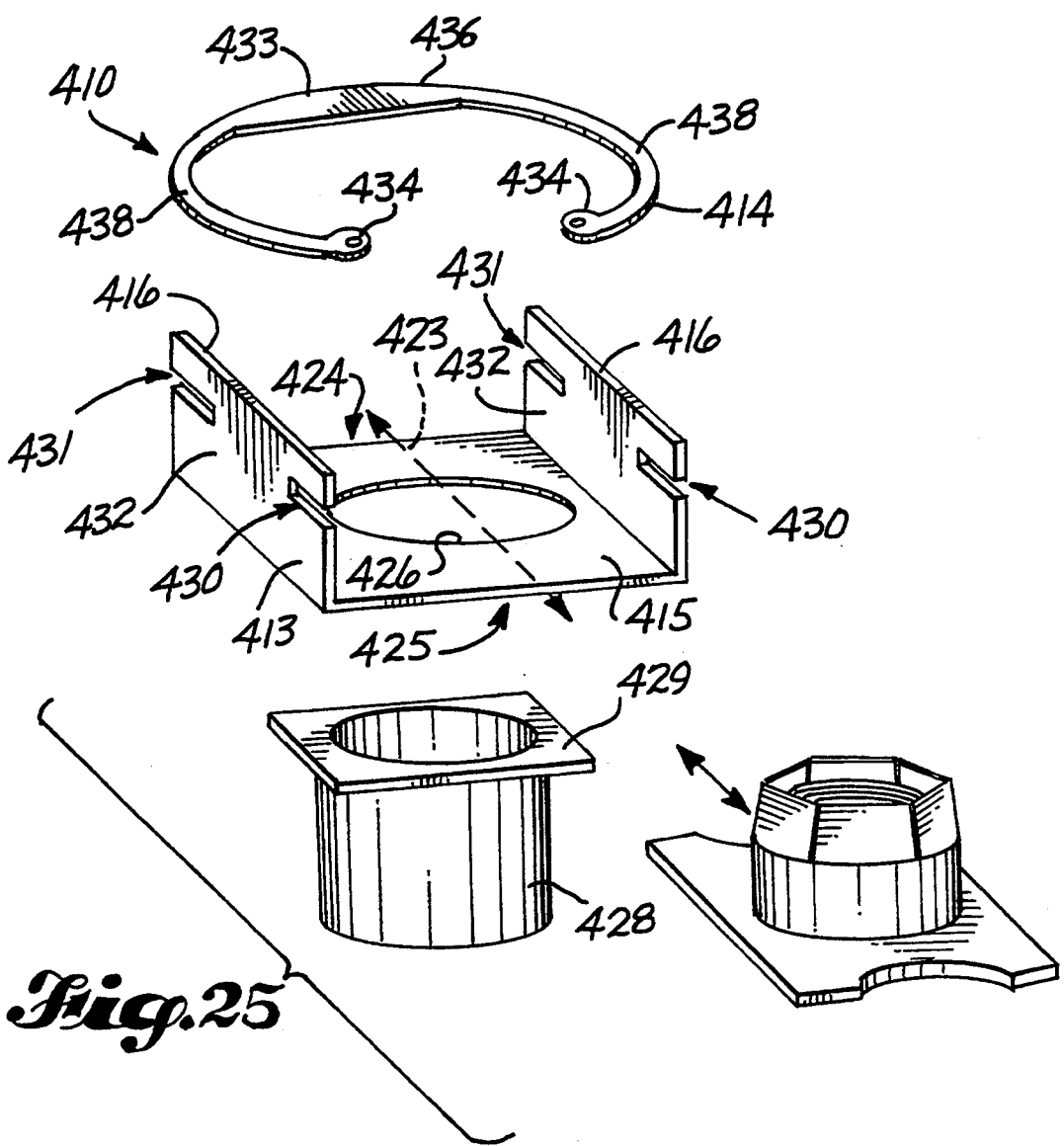
FIG. 25 is an exploded isometric view of yet another alternative embodiment of the nut mount of the present invention.

FIG. 25 is an exploded isometric view of another alternative embodiment for the anchor nut mount 410 of the present-invention. In this embodiment, the mount base 413 is formed separately by a tubular shank retainer 428 and a base plate 415. The base plate 415 includes a circular hole 426 that is larger in diameter than the circular bolt holes of the previous embodiments. The tubular shank retainer 428 includes a flange 429 at its upper end. The tubular portion of the shank retainer 428 extends through the enlarged diameter hole 426 of the base plate 415, and the flange 429 seats against the base plate 415.

The snap ring support structures 416 include sidewall portions that are straight and parallel with each other. The sidewall portions define a nut channel 423 having a first end 424 and a second end 425. The sidewall portions 416 include forward slots 430 and rear slots 431. Slots 430, 431 are spaced above the base plate 415. The slots 430, 431 define a neck portion 432 therebetween.

The snap ring 414 is similar to the snap ring of FIGS. 3–8. The snap ring includes a loop portion 433 having a closed end 436 and end portions or knobs 434. The snap ring 414 includes side portions 438 that extend around the neck portions 432 of the base sidewall portions 416. The snap ring 414 is captured within the slots 430, 431 and carried by the spring support structures 416 above the base plate 415.

Figure 26:
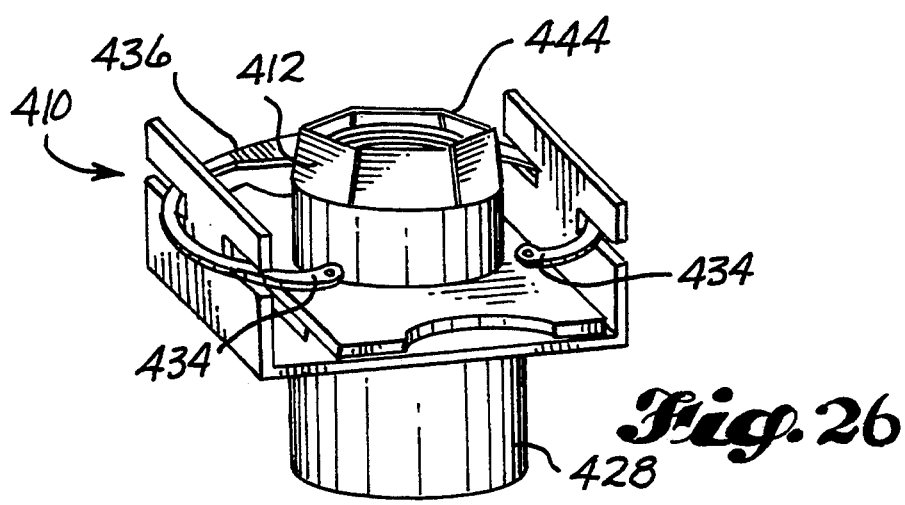
FIG. 26 is an assembled view of the nut mount of FIG. 25, shown with an anchor nut mounted to the nut cage.

FIG. 26 is an assembled view of the anchor nut mount 410 of FIG. 25. The tubular neck 444 of the anchor nut 412 is captured between the closed end 436 and the end knobs 434 of the snap ring 414. The installation of the nut mount 410 is similar to the installation of the nut mount discussed with reference to FIGS. 3–8, except that the tubular shank retainer 428 is inserted separately through the hole 426 of the base plate 415 and then inserted into a fastener hole of a structural member and coldworked therein.

It is within the scope of the invention to secure the tubular shank within an opening by means other than cold expansion. For example, the hole can be threaded and matching threads can be placed on the tubular shank, enabling the tubular shank to be screwed into the threaded opening. Or, the tubular shank could be made longer than the opening into which it is inserted so that it has an end portion which projects out the back side. Once the tubular shank is installed in the opening, the projecting end portion can be flared to in that manner connect the tubular shank to the workpiece. Also, the anchor nut mount of this invention can be used in a wide variety of workpiece members and materials. It can be used in metal members, composites and various structural plastics.

It is to be understood that many variations in size, shape, and construction can be made to the illustrated and above-described embodiment without departing from the spirit and scope of the present invention. Some of the features of the preferred embodiment may be utilized without other features. Therefore, it is to be understood that the presently described and illustrated embodiment is non-limitive and is for illustration only. Instead, my patent is to be limited for this invention only by the following claim or claims interpreted according to accepted doctrines of claim interpretation, including the doctrine of equivalence and reversal of parts.

What is claimed is:

1. A nut mount for use with an anchor nut having a nut base and an internally-threaded tubular neck upstanding from the nut base, the nut mount comprising:
   a mount base having a base plate and a pair of laterally-spaced base sidewall portions projecting from the base plate and, together with the base plate, defining a nut channel having first and second ends, the base sidewall portions including outer side regions having snap ring-receiving slots that are spaced from the base plate; and
   a snap ring having side portions within the snap ring-receiving slots and a closed end at the first end of the nut channel, the closed end extending from one base sidewall portion to the other base sidewall portion and forming a closure for the first end of the nut channel, the snap ring also including a pair of ring end knobs at the second end of the nut channel, the ring end knobs projecting from the base sidewall portions laterally into the nut channel and defining between them a nut avenue, the snap ring being openable by contact with the tubular neck of the nut as the nut is snap moved into or snap moved out from the nut channel.

2. The nut mount of claim 1, wherein the base plate includes a circular bolt hole therethrough, and the mount base includes a tubular shank retainer extending from the base plate, the tubular shank retainer being aligned with the circular bolt hole of the base plate.

3. The nut mount of claim 2, wherein the base plate of the mount base is circular and the outer regions of the base sidewall portions are circular.

4. The nut mount of claim 3, wherein the inner side regions of the base sidewall portions include grooves between the snap ring-receiving slots and the base plate.

5. The nut mount of claim 1, wherein the base sidewall portions are spaced from each other a distance slightly larger than the width of the nut base, whereby the nut base has some lateral float between the base sidewall portions.

6. The nut mount of claim 1, wherein the closed end of the snap ring is spaced longitudinally from the end knobs of the snap ring a distance greater than the width of the threaded neck of the nut, whereby the nut has some longitudinal float between the snap ring closed end and end knobs.

7. The nut mount of claim 6, wherein the closed end of the snap ring includes an inner bulge projecting toward the end knobs, the inner bulge being spaced from the ring end knobs a distance slightly greater than the width of the threaded neck of the nut, whereby the longitudinal float provided for the nut along the nut channel is slightly reduced.

8. The nut mount of claim 1, wherein the closed end of the snap ring includes a collar.

9. A nut mount for use with an anchor nut having a nut base and an internally-threaded tubular neck upstanding from the nut base, for receiving a threaded bolt in order to secure a first member to a second member, the nut mount comprising:
   a mount base having a base plate with a circular bolt hole therein and a pair of laterally-spaced base sidewall portions projecting from the base plate on opposite sides of the circular bolt hole and, together with the base plate, defining a nut channel having first and second ends, the base sidewall portions defining lateral stops for containing the nut base laterally, and
   a flexible snap ring with side portions held by the base sidewall portions, the snap ring including a loop portion closing off the first end of the nut channel and a pair of ring end knobs at the second end of the nut channel spaced from each other a distance less than the width of the threaded neck of the nut, the ring end knobs and the loop portion of the snap ring defining longitudinal stops for confining movement of the nut in a longitudinal direction, the ring end knobs defining a nut avenue that is openable by contact with the tubular neck of the nut as the nut is snap fitted into or snap fitted out of the nut channel.

10. The nut mount of claim 9, wherein the ring side portions are expandable from the base sidewall portions outwardly therefrom to allow the ring end knobs to move apart and open at the second end of the nut channel.

11. The nut mount of claim 10, wherein the outer regions of the base sidewall portions include snap ring-receiving slots for holding the side portions of the snap ring.

12. The nut mount of claim 9, wherein the mount base includes a tubular shank retainer extending from the base plate in alignment with the circular bolt hole of the base plate.

13. The nut mount of claim 9, wherein the inner regions of the base sidewall portions of the base plate include snap ring receiving slots, and the side portions of the snap ring include elbows that are received within the snap ring-receiving slots, the elbows projecting into the snap ring-receiving slots from inward sides of the slots.

14. The nut mount of claim 13, wherein the snap ring-receiving slots provide sufficient clearance for the elbows to allow the elbows the flex and the ring end knobs to open upon the anchor nut being snap fitted into or snap fitted out of the nut channel.

15. The nut mount of claim 9, wherein the base plate includes a smooth surface about the circular bolt hole for slidably receiving the base portion of the anchor nut upon snap fitting the anchor nut into the nut channel.

16. A nut mount for use with an anchor nut having a nut base and an internally-threaded tubular neck upstanding from the nut base, the nut mount comprising:
   a mount base having a base plate with a circular bolt hole therein and a C-shaped sidewall portion projecting from the base plate about the bolt hole and, together with the base plate, defining a nut channel having an open end, the inner regions of the C-shaped sidewall include snap ring-receiving slots therein,
   a flexible snap ring having elbow-shaped side portions for insertion into the snap ring-receiving slots, and a pair of ring end parts at the open end of the nut channel, the ring end parts defining longitudinal stops for confining movement of the anchor nut in a longitudinal direction, the ring end parts being spaced from each other a distance less than the width of the tubular neck of the anchor nut, the snap ring being expandable by contact of the ring end parts with the tubular neck as the anchor nut is snap moved into or snap moved out from the nut channel.

17. The nut mount of claim 16, wherein the base plate includes a circular bolt hole therethrough, and the mount base includes a tubular shank retainer extending from the base plate, the tubular shank retainer being aligned with the circular bolt hole of the base plate.

18. In a nut mount having a base connectable to a structural member, the base having a nut supporting surface, the improvement comprising:
   a retainer ring having a closed end, opposite closed sides and an open end, defined by a pair of cam surfaces, and
   a spring support structure on said base holding said spring within a plane that is substantially parallel to, and spaced from, said nut supporting surface,
   whereby a nut can be placed on said nut supporting surface adjacent the open end of the retainer ring, and pushed into contact with the cam surfaces, to snap fit the nut into the retainer ring.

19. A nut mount for use with an anchor nut having a nut base and an internally-threaded tubular neck upstanding from the nut base, the nut mount comprising:
   a mount base having a base plate and a pair of laterally-spaced base sidewall portions projecting from the base plate and, together with the base plate, defining a nut channel having first and second ends, the base sidewall portions including outer ends adjacent the first and second ends at the nut channel, the base sidewall portions including forward and rear slots extending longitudinally along the base sidewall portions from the outer ends thereof and defining a neck portion between the slots, and
   a snap ring having side portions within the forward and rear slots and extending around the outer side of the neck portion, the snap ring also including a closed end at the first end of the nut channel and a pair of ring end knobs at the second end of the nut channel, the ring end knobs being openable by contact with the tubular neck of the nut as the nut is snap moved into or snap moved out from the nut channel.

20. A method of securing an anchor nut about a fastener hole in a structural member, The anchor nut including a base and an internally threaded tubular neck upstanding from the base, the method comprising the steps of:
   mounting an anchor nut mount about the fastener hole, the nut mount including a base plate, a retainer ring support structure, and a retainer ring held by the retainer ring support structure and spaced from the base plate, the retainer ring including a closed end and an open end, the open end defined by a pair of cam surfaces, and
   snap-fitting the anchor nut onto the nut mount by sliding the base of the nut between the base plate and the retainer ring while moving the tubular neck of the nut through the open end of the retainer ring, the cam surfaces of the retainer ring opening to allow passage of the tubular neck,
   whereby the anchor nut is loosely held on the nut mount by the spring support structure and the retainer ring.

21. The method of claim 18, wherein the step of mounting an anchor nut mount about the fastener hole includes inserting a tubular shank retainer portion of the nut mount into the fastener hole and expanding the tubular shank retainer by coldworking in order to secure the tubular shank retainer within the fastener hole.

* * * * *

UNITED STATES PATENT AND TRADEMARK OFFICE
CERTIFICATE OF CORRECTION

PATENT NO. : 5,380,136
DATED : January 10, 1995
INVENTOR(S) : Charles M. Copple and Leonard F. Reid It is certified that error appears in the above-indentified patent and that said Letters Patent is hereby corrected as shown below:

On the cover, under Section [56], "References Cited", "Other Publications", the first line, "Retaining Ring" should be -- Retaining Rings --.

Column 1, line 32, "bolt:" should be -- bolt --.

Column 2, line 64, "]lave" should be -- have --.

Column 5, line 40, "belt" should be -- bolt --.

Column 6, line 62, "portions ! 6" should be -- portions 16 --.

Column 11, line 35, "ion" should be -- in --.

Column 12, line 14, "present-invention" should be -- present invention --.

Claim 21, column 16, line 31, "claim 18" should be -- claim 20 --.

Signed and Sealed this

Fourth Day of July, 1995

Attest:

BRUCE LEHMAN

*Attesting Officer*     *Commissioner of Patents and Trademarks*